(12) United States Patent
Ortega (10) Patent No.: US 9,365,229 B2
(45) Date of Patent: Jun. 14, 2016

(54) TOW TYPE RUNNING STROLLER

(76) Inventor: Giovani M. Ortega, Arlington, VA (US)

( * ) Notice: Subject to any disclaimer, the term of this patent is extended or adjusted under 35 U.S.C. 154(b) by 33 days.

(21) Appl. No.: 14/237,730

(22) PCT Filed: Aug. 27, 2012

(86) PCT No.: PCT/US2012/052430
§ 371 (c)(1),
(2), (4) Date: Feb. 7, 2014

(87) PCT Pub. No.: WO2013/032968
PCT Pub. Date: Mar. 7, 2013

(65) Prior Publication Data
US 2014/0203529 A1 Jul. 24, 2014

Related U.S. Application Data

(60) Provisional application No. 61/528,280, filed on Aug. 28, 2011.

(51) Int. Cl.
| | | |
|---|---|---|
| *B62B 1/10* | (2006.01) | |
| *B62B 7/02* | (2006.01) | |
| *B62B 9/20* | (2006.01) | |
| *B62B 5/00* | (2006.01) | |
| *B62B 5/06* | (2006.01) | |

(52) U.S. Cl.
CPC ... *B62B 7/02* (2013.01); *B62B 1/10* (2013.01); *B62B 9/20* (2013.01); *B62B 5/0079* (2013.01); *B62B 5/068* (2013.01)

(58) Field of Classification Search
CPC .............. B62B 1/00; B62B 1/10; B62B 1/16; B62B 5/00; B62B 5/06; B62B 5/068; B62B 5/08; B62B 5/082; B62B 7/02; B62B 7/00; B62D 51/04

USPC ............. 280/47.25, 1.5, 204, 202, 47.131, 63
See application file for complete search history.

(56) References Cited

U.S. PATENT DOCUMENTS

| | | | |
|---|---|---|---|
| 3,298,685 A | | 1/1967 | Williams |
| 4,033,598 A | * | 7/1977 | King .................... B62C 1/08 280/63 |
| 4,236,723 A | * | 12/1980 | Lemmon ................ 280/1.5 |
| 4,848,780 A | | 7/1989 | Straub |
| 5,062,651 A | * | 11/1991 | Varieur ................ 280/1.5 |
| 5,106,108 A | | 4/1992 | Howell |
| 5,265,891 A | | 11/1993 | Diehl |
| 5,301,963 A | | 4/1994 | Chen |
| 5,375,861 A | * | 12/1994 | Gifford ................ 280/47.38 |

(Continued)

FOREIGN PATENT DOCUMENTS

WO 2013077796 A1 5/2013

*Primary Examiner* — James M Dolak
(74) *Attorney, Agent, or Firm* — Law Offices of Grady L. White, LLC (57) ABSTRACT

A two-wheeled stroller is disclosed and claimed. The stroller is a tow-type stroller to enable a child to accompany an attendant who is engaged in walking or running activity over a variety of ground surfaces and grades at various walking and running velocities. The stroller includes a carriage assembly, a tow bar assembly, and a harness assembly. The carriage assembly includes a seat upon which the child being transported is seated and two wheels, with the center of gravity of the carriage assembly and child (if present) positioned below the wheel axis of rotation. The harness assembly is adjustably affixed to the attendant, and is connected to the carriage assembly by the tow bar assembly.

9 Claims, 9 Drawing Sheets

(56) References Cited

U.S. PATENT DOCUMENTS

| | | | |
|---|---|---|---|
| 5,474,316 A | 12/1995 | Britton | |
| 5,624,128 A * | 4/1997 | Owens | A61G 5/00 280/1.5 |
| 5,687,980 A * | 11/1997 | Eckroth | B62K 27/12 280/204 |
| 5,884,920 A | 3/1999 | Seto | |
| 6,027,001 A * | 2/2000 | Levitan | 224/184 |
| 6,139,033 A | 10/2000 | Western | |
| 6,349,949 B1 * | 2/2002 | Gorringe | 280/1.5 |
| 6,685,198 B1 | 2/2004 | Hartman | |
| 7,007,956 B1 | 3/2006 | Pinon | |
| 7,311,313 B1 | 12/2007 | Ray et al. | |
| 7,600,764 B1 * | 10/2009 | Parker | 280/47.131 |
| 7,938,409 B2 | 5/2011 | Mejia | |
| 8,091,899 B2 | 1/2012 | Mejia | |
| 8,695,992 B2 * | 4/2014 | Piaget et al. | 280/1.5 |
| 2001/0030402 A1 | 10/2001 | White | |
| 2003/0111813 A1 | 6/2003 | Assaf et al. | |
| 2007/0187910 A1 | 8/2007 | Adams | |
| 2008/0238024 A1 | 10/2008 | Heidenreich et al. | |
| 2008/0296851 A1 | 12/2008 | Hall | |
| 2012/0025494 A1 | 2/2012 | Griffith | |

* cited by examiner

TOW TYPE RUNNING STROLLER

TECHNICAL FIELD

The present invention relates to strollers, and, more particularly, the present invention relates to an improved tow-type walking, running or jogging stroller.

BACKGROUND ART

Jogging strollers (also referred to as running strollers, walking carriages, jogging carriages and running carriages) are a popular means by which adult attendants can take their babies, toddlers and small children along when the adult attendants are engaged in walking, jogging, or running exercises. The vast majority of commercially available jogging strollers are pushed by the attendant. Push-type strollers require that the attendant use one or both of his or her arms and hands to propel and control the stroller during operation. This requirement restricts arm swing that naturally occurs in humans during walking and running. Arm swing during running, at any speed, affects factors such as center of mass; forward propulsion; and various components of angular momentum. Therefore, restricted arm swing can affect critical factors that mediate the biomechanical efficiencies inherent in human locomotion.

Steering mechanisms employed by push-type strollers may compromise the safety of the child and the attendant at higher travel velocities. Steering designs often employed by push-type strollers include front wheels that swivel or caster to allow the attendant to steer the stroller while maintaining wheel contact with the ground at all times. Similar to shopping cart wheels, the front caster(s) used for push-type strollers tend(s) to "shimmy" as the stroller is propelled at higher velocities and could create lateral instability localized at the front end of the stroller. This instability could result in loss of steering control at increased travel speeds and thus compromise the child's safety. When subjected to uneven travel surfaces or obstacles along the path, such as a pebble, the direction of the affected caster tends to deviate from the path of progression, potentially resulting in abrupt changes in stroller direction that may further compromise control of the stroller. Strollers designed for higher jogging speeds often employ three wheels with a non-caster front wheel. To steer this type of stroller, the front wheel must be lifted away from the ground. This maneuver requires that the runner press downwardly on the rear stroller handle, using the rear wheel axle as a fulcrum by which to lift the front wheel up and away from the ground sufficiently to turn the stroller laterally, either completely or incrementally, in the desired direction. The weight of the stroller and the occupant is borne over the rear axle and is solely dependent on the stability and strength of the attendant's arm(s) to maintain balance during this maneuver. Some manufacturers offer front wheel designs that may be placed in either the fixed or swivel position but recommend that users lock the wheel in the "forward" position when operating the stroller at higher jogging speeds for the safety reasons stated above.

The vertical load component of known "hands-free" stroller designs result in decreased biomechanical running efficiencies due to the additional vertical load(s) placed on the attendant, and produce a jarring interaction between attendant and carriage (and child) generated by the attendant's movements, especially at higher running velocities.

When walking, jogging, or running, a person typically exhibits some lateral motion that can be translated to the carriage (and therefore the child passenger) via the tow bar. Control of this motion is especially critical for two wheeled vehicles, given the possibility that the resulting side-to-side carriage motion, as it periodically changes direction of the carriage's inertia (from left to right and right to left), could achieve a resonant frequency that could result in loss of steering control or, at minimum, result in a jarring motion for both the attendant and the child.

Furthermore, the attendant's walking/jogging/running motion may create anterior/posterior impulses between the attendant and the carriage during operation. In bipedal human locomotion, whether walking or running, the attendant's COG accelerates upon "push off" and decelerates upon "heel contact" of each step. This anterior/posterior acceleration/deceleration is translated to the carriage assembly and occupant via the tow bar—albeit asynchronously. Upon "push off," the attendant's COG accelerates along the path of progression and the carriage experiences a corresponding acceleration. Upon heel contact, the attendant's COG decelerates. Due to the inertia of the carriage, however, the corresponding carriage deceleration will lag behind that of the attendant's deceleration, thus establishing a cycle by which the acceleration/deceleration of the carriage and attendant will be out of phase. This repetitive action generates a jarring impulse experienced at each end of the tow bar by both the attendant and the carriage at each of the attendant's steps.

Disclosure of Invention

Disclosed herein is a tow-type two-wheeled jogging stroller that employs a dropped axle design, whereby the carriage frame, wheels, occupant seat and body engaging means are arranged such that the degrees of freedom of each component, relative to each other, are limited to a rotation in the saggital plane about a single axis of rotation, and the load bearing components of the carriage assembly are arranged such that the center of gravity of the carriage load is borne below the single axis of rotation. The body engaging means, comprising a tow bar assembly, a cross bar, an articulated assembly and a waist belt, is configured such that the attendant tows and steers the carriage assembly without the use of the attendant's arms or hands.

In preferred embodiments, the tow bar assembly provides a resilient means by which the anterior/posterior and medial/lateral impulses generated between the carriage and the attendant during operation are mediated. Thus, as will be described in more detail below, the carriage assembly and tow assembly components of the stroller are arranged to minimize the vertical and horizontal loads borne by the attendant, to attenuate the impulses imparted on the carriage assembly, and to maximize the safety of the child occupant consequential to the mechanical interaction between the carriage assembly and attendant during walking or running.

In general, embodiments of the invention include a carriage assembly, a tow bar, and a harness. The carriage assembly includes a seat for accommodating a passenger and two wheels having an axis of rotation. The tow bar assembly has first and second ends, the first end coupled to the carriage assembly, and the second end being coupled to the harness, which may be adjustably configured to be connected to the attendant. The components are coupled together such that when the carriage assembly is in use, the COG is located below the axis of rotation of the wheels. Moreover, the seat preferably is positioned such that when a child is seated therein, a combined center of gravity of the child and the carriage assembly is located below the axis of rotation while the stroller is in use. To facilitate positioning the center of gravity below the axis of rotation, the carriage assembly may be provided with two axles, a first axle associated with a first of the two wheels and a second axle associated with a second of the two wheels, the first and second axles being separate and substantially collinear.

The carriage assembly may also include an elongate cross bar. Preferably, the cross bar is rotatably coupled to the carriage assembly along the wheel axis of rotation at first and second ends thereof, and fixedly coupled to the tow bar at an intermediate location thereof. The carriage assembly may further include one or more stops to limit the rotation of the cross bar relative to the frame.

The carriage assembly may also include an elongate cross bar. Preferably, the cross bar is fixedly coupled to the carriage assembly along the wheel axis of rotation at first and second ends thereof, and rotatably coupled to the tow bar at an intermediate location thereof. The carriage assembly may further include one or more stops to limit the rotation of the cross bar relative to the frame.

The tow bar preferably is configured to attenuate acceleration of the harness relative to the carriage assembly. To this end, the tow bar may include a first member coupled to the carriage assembly, a second member coupled to the harness, and a damping element coupled to the first and second members. The first and second members are coupled together so as to allow relative movement therebetween, and the damping element is configured to provide resistance to such movement. These elements may be positioned in a variety of ways. For example, the first and second members may be substantially parallel with the damping element being substantially parallel to the first and second members when the tow bar assembly is in a neutral, compressed or extended position. As another example, the first and second members may be substantially parallel with the damping element being substantially perpendicular to the first and second members.

The combination and assembly of the components disclosed below provide a number of benefits over previous tow-type stroller designs, including without limitation: (1) minimized overall vertical load bearing by the attendant while walking or running; (2) reduced vertical movement as experienced by the carriage assembly occupant; (3) attenuated anterior/posterior impulses experienced by the attendant and carriage assembly occupant; (4) minimized lateral carriage assembly movement imparted by attendant's side-to-side motion during walking or running; and (5) improved occupant safety by means of a seat provided with safety roll bars, which is situated such that the center of gravity is below the wheel axis. The disclosed arrangement of components also provides improved biomechanical efficiency over conventional push-type strollers by permitting natural arm swing during walking/running, as well as improved steering stability at higher jogging/running speeds.

The major carriage assembly components are configured to permit the seat to be quickly engaged/disengaged from the carriage frame, the distance of the seat's center of gravity to be adjusted relative to the wheel axis, and the tow bar assembly to be quickly engaged/disengaged from the carriage assembly and from the body engaging means located at the rear of attendant's lower back. Furthermore, the wheel assembly may be quickly engaged/disengaged from the carriage frame or may be rotated along an axis perpendicular to wheel hub axis to and about the carriage assembly to substantially reduce the size and volume of the carriage assembly to facilitate easier storage when it is not in use.

BRIEF DESCRIPTION OF DRAWINGS

The present invention is described with reference to the accompanying drawings, which illustrate exemplary embodiments and in which like reference characters reference like elements. It is intended that the embodiments and figures disclosed herein are to be considered illustrative rather than restrictive.

DETAILED DESCRIPTION

Figure 1:
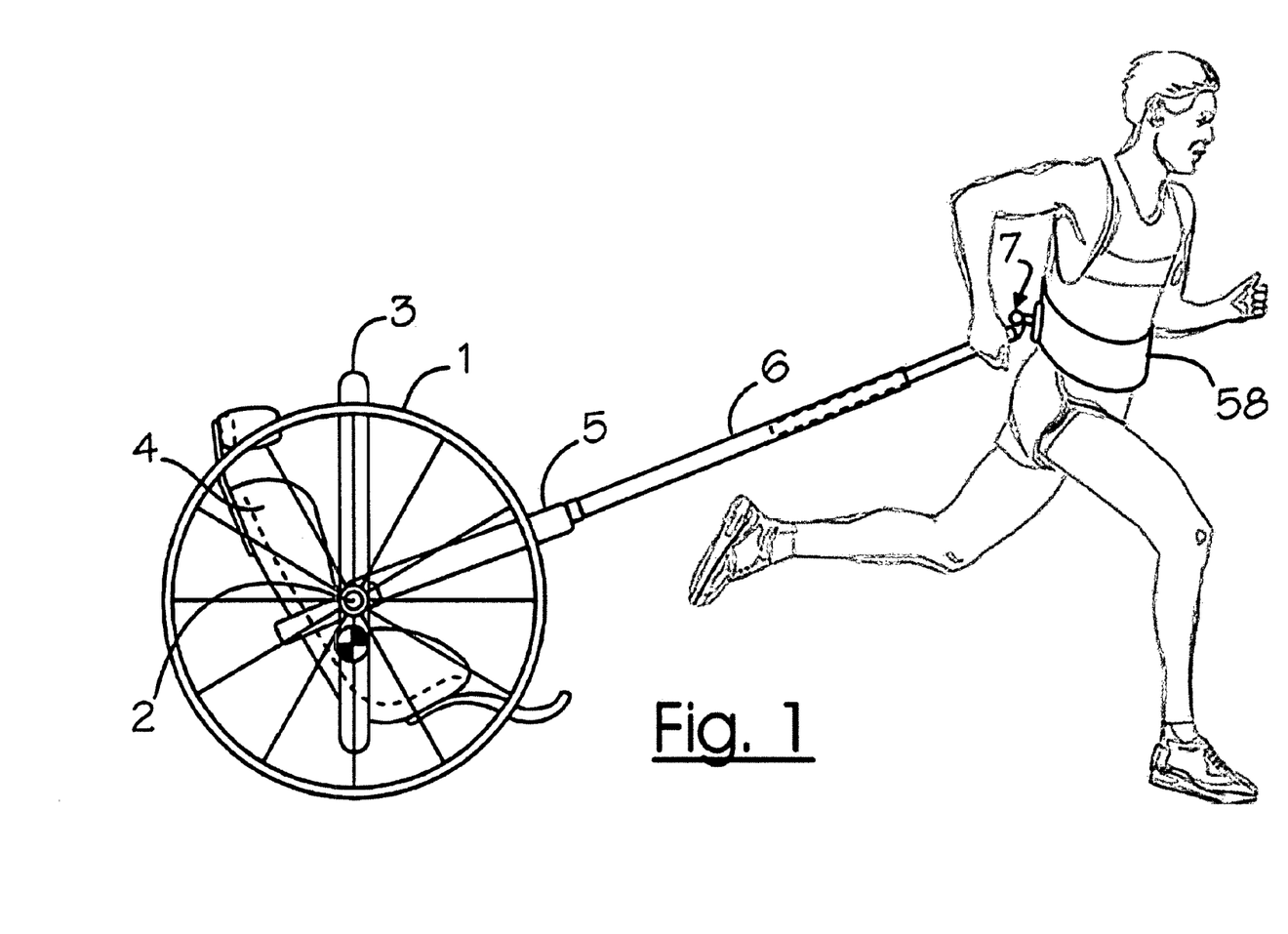
FIG. 1 shows a tow-type stroller in a use position, in accordance with one embodiment of the present invention, while the stroller is being propelled and controlled by an attendant.

FIG. 1 illustrates a tow-type stroller being propelled and controlled by an attendant while the attendant is jogging. It should be understood, however, that embodiments of the present invention may also be beneficially used while the attendant is merely walking. Certain embodiments may also be configured to attach to a bicycle or other vehicle, so as to permit the attendant to bring a baby, small child or toddler along for the ride. As shown in FIG. 1, the stroller includes two wheels 1, each with a wheel hub 2, a carriage frame 3, a seat assembly 4 to accommodate a child occupant, a cross bar 5, a tow bar assembly 6, an articulating assembly 7, and a waist belt 8.

Figure 2:
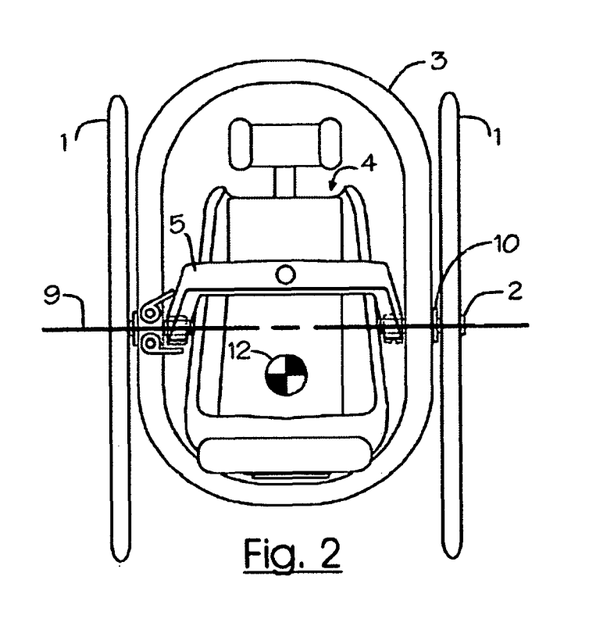
FIG. 2 shows a front view of the carriage assembly of the tow-type stroller of FIG. 1.

FIG. 2 depicts a carriage frame 3 provided with two supporting wheels 1 spaced apart along the wheel axis 9 in a direction laterally of the direction of movement of the carriage frame 3 where each of two wheel axle 10 means is secured directly to the carriage frame 3. Both wheel axle means 10 are coaxial to the wheel axis 9 and together bear the carriage assembly load such that all of the load supporting base of the carriage frame 3 is suspended from the axle means below the wheel axis (dropped axle) and the load base portion is positioned below a horizontal plane including the wheel axis at all times during normal use of the carriage assembly, including when the carriage is at rest and in transporting position. The purpose of this configuration is to position the load center of gravity (COG) 12 below the wheel axis 9.

Figure 3:
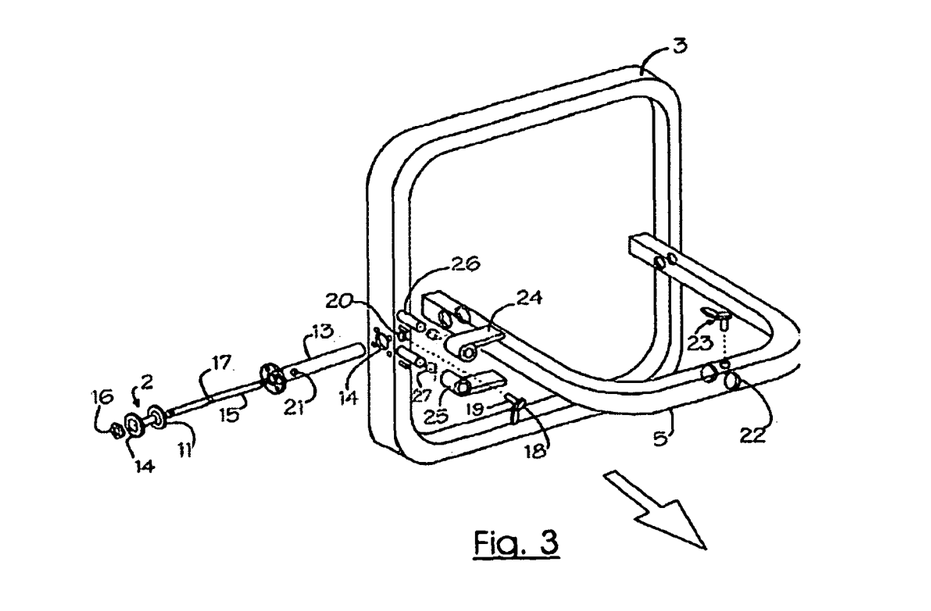
FIG. 3 shows an exploded view of the connection of the carriage assembly and cross-bar components of the tow-type stroller of FIG. 1.

FIG. 3 shows an exploded view of the connection of the carriage frame 3 and cross-bar 5 components of the tow-type stroller of FIG. 1. For the sake of simplicity, only one of the connections is shown in exploded view in FIG. 3. As shown in FIGS. 2 and 3, the axle means 10 is comprised of an axle sleeve 13 permanently affixed to the carriage frame 3. Each axle sleeve 13 is secured to a lateral portion of the carriage frame 3 and is located along the carriage frame 3 such that the bottom most portion of the carriage frame 3 does not contact the travel surface (ground) during operation.

Each axle sleeve 13 accepts a wheel spindle 15, which is rotatably connected to the wheel hub 2. One or both ends of the spindle 15 may be threaded to accept a locknut 16. The locknut 16 provides a means to prevent lateral travel of the wheel spindle 15 when the locknut abuts the wheel hub 2. Alternatively, one end of the spindle 15 could be formed into a head to similarly prevent lateral travel of the wheel spindle 15 when the locknut abuts the wheel hub 2. Perpendicular to the axis of the spindle, a groove 17 may be machined along the length of the spindle 15. There are a variety of ways by which the spindle 15 may be secured within the axle sleeve 13. In this illustration, a toggle clamp 18 is shown as a possible means to detachably connect said spindle 15 within the axle sleeve 13. The toggle clamp 18 is connected to the carriage frame 3 such that when the toggle clamp plunger 19 is extended, it passes through a hole 20 drilled in the anterior portion of the carriage frame 3 and a hole 21 drilled perpendicular to the axis of the axle sleeve 13. The wheel spindle 15 is accepted into the axle sleeve 13 such that the wheel spindle groove 17 lines up with the two holes 20 and 21. When the toggle clamp plunger 19 is extended, it passes through said holes 20 and 21 and is pressed and seated within the wheel spindle groove 17 when the wheel spindle 15 is located within the axle sleeve 13.

The lengths of the axle sleeves 13 that protrude through the interior portions of the carriage frame 3 provide a means to connect a detachable crossbar 5. When connected, the crossbar 5 rotates freely about the wheel axis 9.

Referring again to FIG. 1, one end of the tow bar assembly 6 is connected to the crossbar 5. The other end of the tow bar assembly 6 is connected to the attendant for the purpose of towing the carriage assembly. There are numerous means by which to detachably connect the tow bar assembly to the cross bar. As an example, a hole 22 may be drilled through the center portion of the crossbar 5 (the bottom of the "U") to accept one end of the tow bar assembly 6 such that the axis of the tow bar assembly 6 is perpendicular to the wheel axis 9 whenever it is connected to the crossbar 5. In this example, a toggle clamp assembly 23 is used to detachably connect the tow bar assembly 6 to the crossbar 5 in a manner similar to the method by which the toggle clamp 18 is utilized to detachably connect said spindle 15 within the axle sleeve 13.

Beneficially, the carriage frame 3, cross bar 5, axle sleeves 13 and wheel hub 2 components are configured relative to each other such that all relative motion between said components is limited to single degree of rotational movement in the saggital plane about a single wheel axis 9.

Excessive forward rotation of the carriage frame 3 about the wheel axis 9 could result in the front most portion of the carriage assembly striking the travel surface. Similarly, excessive rearward rotation could cause the back portion of the carriage assembly to contact the travel surface. Excessive rotation as described above may be controlled via a rotation limiter. There are numerous means by which to govern excessive rotation. One possible means to govern the rotation of the carriage assembly about the wheel axis is shown and includes an upward limiting arm 24 and a downward limiting arm 25. The upward limiting arm 24 is rotatably connected to a post 26. The axis of said post is oriented in the direction of travel and is connected to the carriage frame 3. The position of the upward limiting arm 24 may be maintained onto the post 26 via a retaining clip and is oriented such that that the upward limiting arm 24 contacts the superior aspect of the crossbar 5 and resists the forward rotation of the carriage frame 3 at a rate and magnitude of force determined by the properties of a governing device such as a torsional spring 27 as shown in the illustrated embodiment. Similarly, a downward limiting arm 25 provides a means to resist the backward rotation of the carriage frame 3.

Figures 4A, 4B:
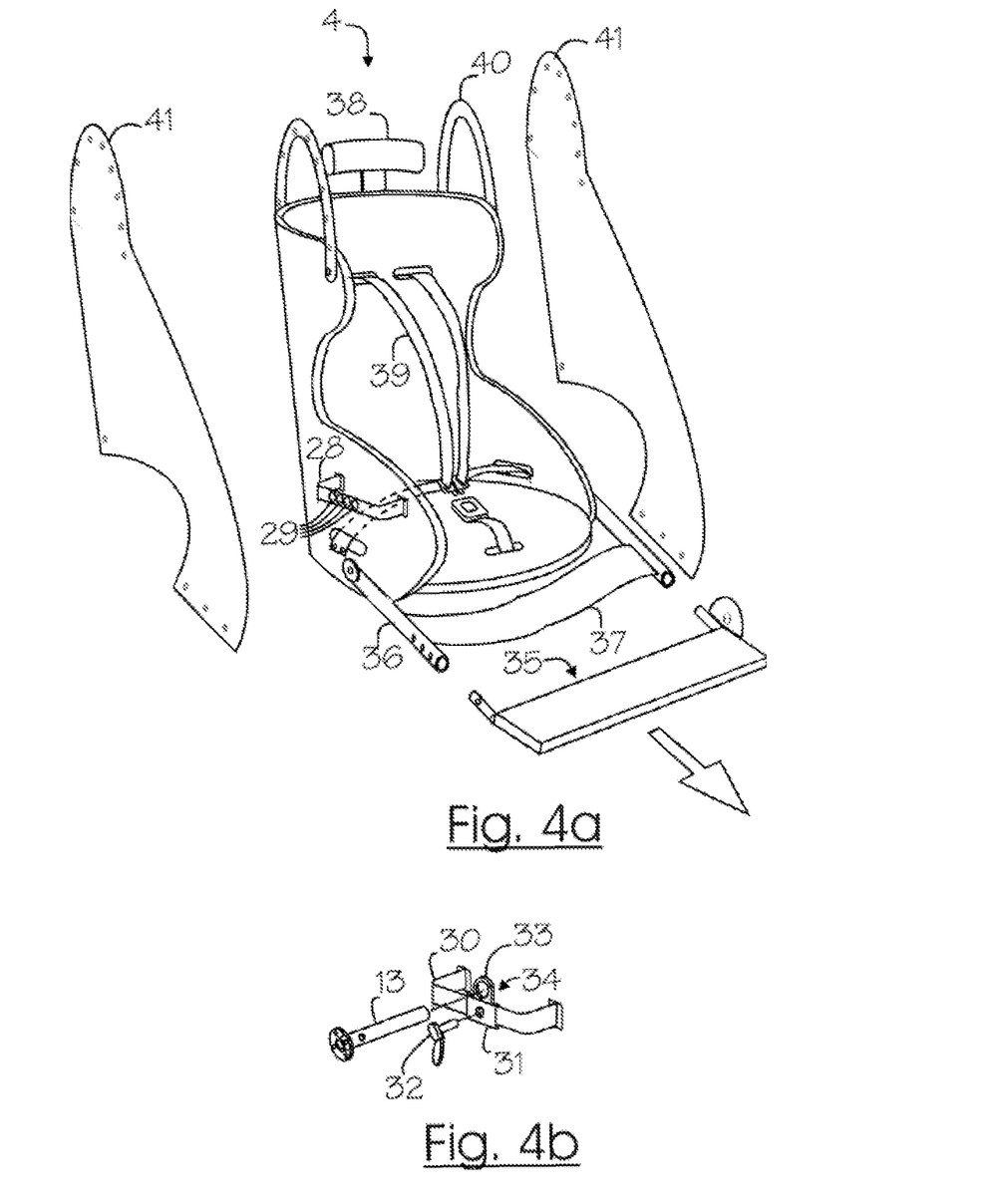
FIG. 4A shows a single seat assembly of the tow-type stroller of FIG. 1.
FIG. 4B shows an alternative means of connecting the single seat assembly shown in FIG. 4A to the axle sleeve of the tow-type stroller shown in FIG. 1.

FIG. 4A illustrates a single seat assembly 4 for a child occupant. The seat assembly may be detachably connected to the load supporting portions of the carriage frame 3 either along the interior bottom portions of the carriage frame 3 or the lateral interior portions of the carriage frame 3. In another embodiment, a bracket 28 connected to the exterior and lateral portion of the seat assembly 4 provides a means to adjustably connect the seat assembly to the axle sleeve 13 such that the seat assembly rotates about the wheel axis 9. In this example, the bracket provides a plurality of holes 29 each of which can accept the protruding end of the axle sleeve 13 for the purpose of adjusting the relative position of the COG 12 from the wheel axis 9. (See FIG. 2).

Alternatively, and as illustrated in FIG. 4B, the function of adjusting the COG position relative to the wheel axis may be accomplished by connecting a bracket 30 to the exterior and lateral portion of the seat assembly 4 as shown. A sliding connector comprised of a sliding member 31 that can be positioned and secured along the length of the bracket 30 and a locking pin 32, which is connected to the sliding member 31. A coupling mechanism 33 is secured to the end portion of the axle sleeve 13 and oriented so that the portion of the coupling mechanism 33 that accepts the locking pin 32 faces the locking pin. In this example, the locking pin 32 is secured within the coupling mechanism 33 by a latching mechanism 34 when said latching mechanism 34 is in the locked position. The locking pin 32 is released from the coupling mechanism 33 when the latching mechanism 34 is in the open position.

Due to the single axis arrangement, it is desirable to minimize the saggital plane rotation of the seat assembly 4 to thus reduce excessive forward or backward tipping of the carriage assembly during operation. Maximum rotational stability of the assembly may be achieved by localizing the COG directly below the axis line 9. As the body mass distribution of differently sized occupants (children) may result in a varying COG location of the seated occupant, it is desirable to provide a means for adjusting the COG such that it is directly beneath the axis line.

In the example, the seat assembly 4, is comprised of a rigid bottom and a back support and provides a foot rest 35 specially modified in connection with the seat assembly 4 to provide for relative adjustment to accommodate a range of occupant lower limb lengths. The foot rest assembly is comprised of two supporting members 36 each with one end rotatably connected to an exterior portion of the seat assembly 4 and the other end constructed to accept the ends of the foot rest 35, said footrest 35 being generally oriented horizontally with respect to the ground. During operation, the structure of the footrest 35 prevents a seated child's feet from contacting the travel surface. A flexible or a rigid barrier 37 connected between the lengths of the supporting members 36 prevents the seated child's lower limbs from contacting the travel surface.

The leading portion of the footrest 35 has a slight upward angle with respect to ground in the sagittal plane such that the bottom portion of said footrest 35 provides a rigid skid to engage the edge portion of a step, curb, or abutment (curb) to facilitate movement of the carriage assembly thereacross. As the front- and bottommost portion of the skid engages the curb, the carriage frame 3 and seat assembly 4 rotate about the wheel axis 9 permitting unobstructed forward travel of the stroller until the wheels 1 engage the edge portion of the curb. As the stroller is propelled forward, the wheels 1 surmount the curb and thus lift the entire carriage assembly over the curb without further contact between the curb and other portions of the stroller.

A headrest 38 is attached to the back support portion of the seat assembly such that the vertical position of the headrest may be adjusted relative to the seat back to accommodate a variety of seated occupant body heights.

Attached to the seat assembly 4 is a restraining apparatus wherein one or more flexible, strap-like members 39 can be engaged with the body of the child prevent, restrain, or limit movement of the child relative to the seat assembly 4 should the stroller sharply decelerate, collide with another object, or be involved in any sudden, unexpected movement or termination of movement.

Attached to the seat assembly 4 is/are one or more bar arrangements 40 extending over and around the occupant compartment, such bars or bar arrangement 40 designed to protect the occupant should the vehicle overturn.

Attached to the seat assembly 4 and/or the bar arrangements 40 is a flexible film, cloth, mesh, or solid material barrier 41 that prevents the child from accidentally placing any part of the child's body near moving parts of the carriage assembly.

Figure 5:
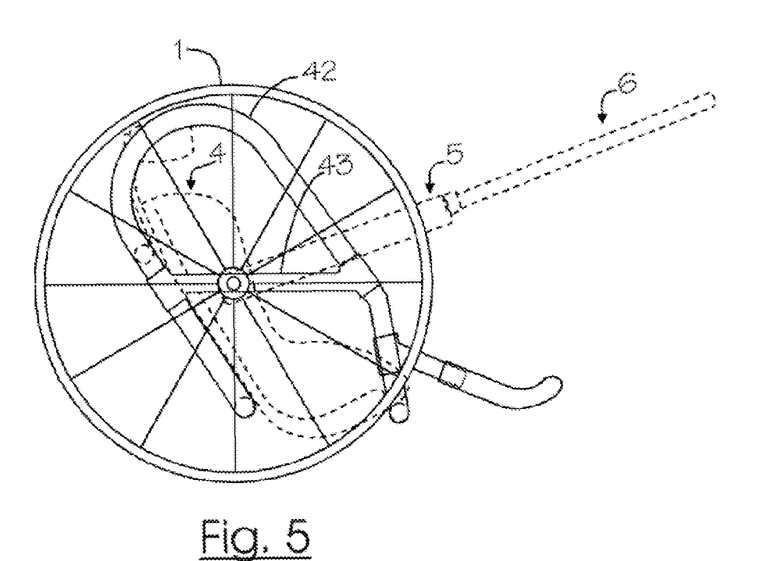
FIG. 5 shows a side view of another embodiment of the carriage assembly component of the tow-type stroller of FIG. 1.

FIG. 5 illustrates an alternative embodiment of the carriage assembly and is heretofore referred to as the cage frame assembly 42. The cage frame assembly 42 is comprised of a bar arrangement to protect the occupant and includes a structural means to connect the supporting wheels 1 and the seat assembly 4. In this example, the wheels 1 are rotatably connected to the cage frame assembly 42 via a horizontal bar member 43. The illustration shows how the crossbar 5 is connected directly to the wheel axle and the tow bar assembly 6 is connected to the crossbar.

Figure 6A:
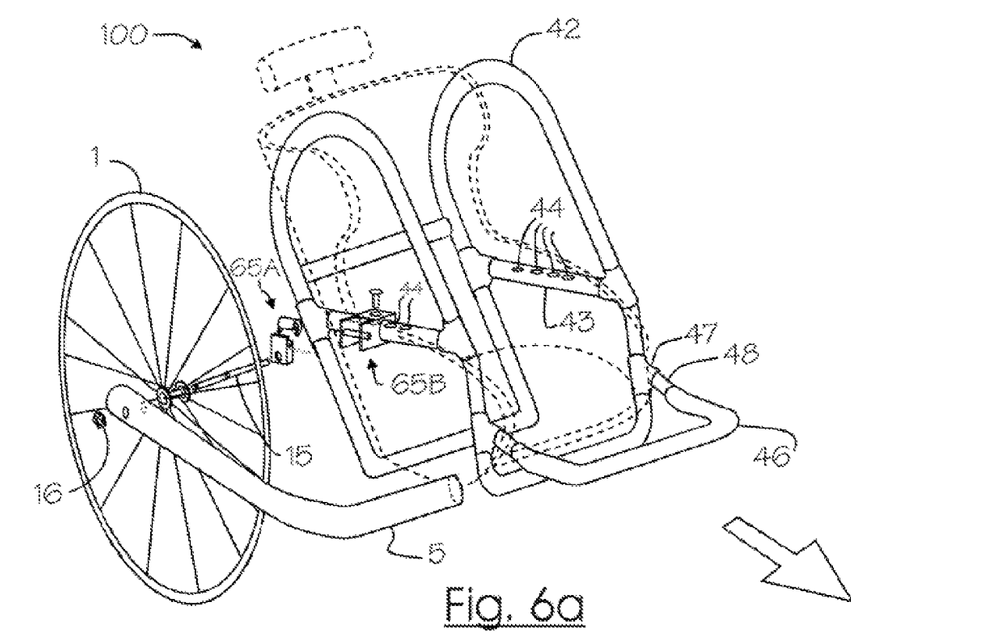
FIG. 6A shows an exploded view of the carriage assembly of FIG. 5.

FIG. 6A shows the cage frame assembly 42 is comprised of one or more light-weight tubes fashioned to provide a rigid support for two wheels 1 spaced apart along the wheel axis 9 in a direction laterally of the direction of movement of the cage frame assembly 42 such that the COG 12 is maintained below the wheel axis 9 (See FIG. 2) at all times during normal use, including when the carriage assembly is at rest and in the transporting position as previously described.

Figure 6B:
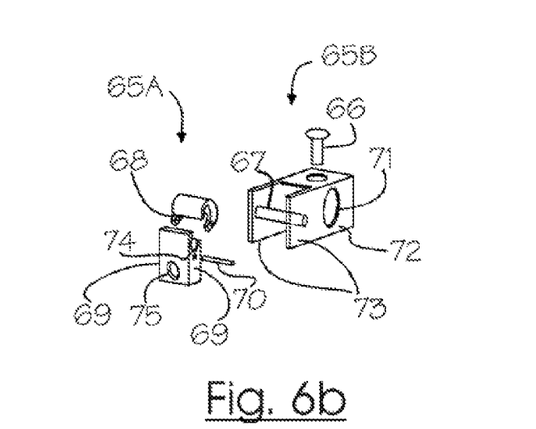
FIG. 6B shows the detail of a latch mechanism associated with the carriage assembly shown in FIG. 6A.

As an example of utilization of the cage frame assembly 42 as a means of supporting the wheels 1, the illustration shows that the threaded end of the wheel spindle 15 protrudes through the exterior portion of the wheel hub and through the end portion of the crossbar 5 (only half of the crossbar is shown to simplify the drawing) and connected to a locknut 16. The other end of the spindle 15 supports part A 65A of a latch mechanism so that the cage frame may be quickly engaged/disengaged from the crossbar and wheel assembly. FIG. 6B shows the detail of the latch mechanism. As shown in FIG. 6B, part B 65B of the latch mechanism is comprised of a structural member 72 fashioned such that it provides support for: a striker 67; a means to slide along the horizontal bar member 43 (in this illustration by way of holes 71 on the lateral portions of the structural member 72); a type of plunger 66 such that when the striker is engaged in the receiving notch 74 of part A 65A of the latch mechanism, both arms 73 of the structural member 72 engage around the lateral portion 69 of part A 65A of the latch mechanism to prevent lateral movement of part B 65B relative to part A 65A of the latching mechanism. Part A 65A of the latching mechanism is comprised of a structural member 69 which is fashioned such that it provides a means to connect to the wheel spindle through the hole 75 shown. Part B 65B of the latch mechanism is connected to the horizontal bar member 43 via the holes 71 such that part B 65B of the latch mechanism can slide back and forth along the length of the horizontal bar member 43 in the direction of travel. Furthermore, the position of part B 65B of the latch mechanism along the length of the horizontal bar member 43 may be fixed via a plunger 66 that secures part B 65B to the horizontal bar member 43 via a plurality of holes 44 along the top of the horizontal bar member 43. The purpose of this sliding and locking function of part B along the horizontal bar member 43 is to provide a means to adjust the distance of the COG relative to the wheel axis 9. Ideally, the attendant can perform this adjustment with minimal effort. However, the position of the final adjustment must remain secured without the possibility of a change in the adjustment position during operation of the stroller. The materials used for the members of this assembly must provide a rigid structure for maintaining a fixed relative position between the wheels 1.

This alternative cage frame assembly 42 provides a means of incorporating a footrest 46 comprised of a rigid structure with two ends each bent at a certain angle to generally form a "U" shape along a certain plane. The ends of said foot rest are further bent away from the plane at a certain angle (theta) that the front end of the footrest 46 structure forms and upwardly angled rigid skid to engage the edge portion of a step, curb, or abutment that may be encountered during operation similar in function to the footrest 35 previously described.

The height, relative to the ground, of each of sliding means 47 attached to the lower front portion of the carriage frame 42 may be raised or lowered. Each sliding means 47 can accept one end of a rigid tube member 48 of a certain length. Each of two rigid tube members 48 is oriented generally in the direction of travel and at a certain angle relative to the ground. The ends of the footrest member 46 can accept an end of the rigid tube member 48 such that the distance between the footrest 46 and the cage frame 42 may be adjusted and secured into place by the user and to provide a means to adjust for different limb lengths of a child occupant.

Figure 7:
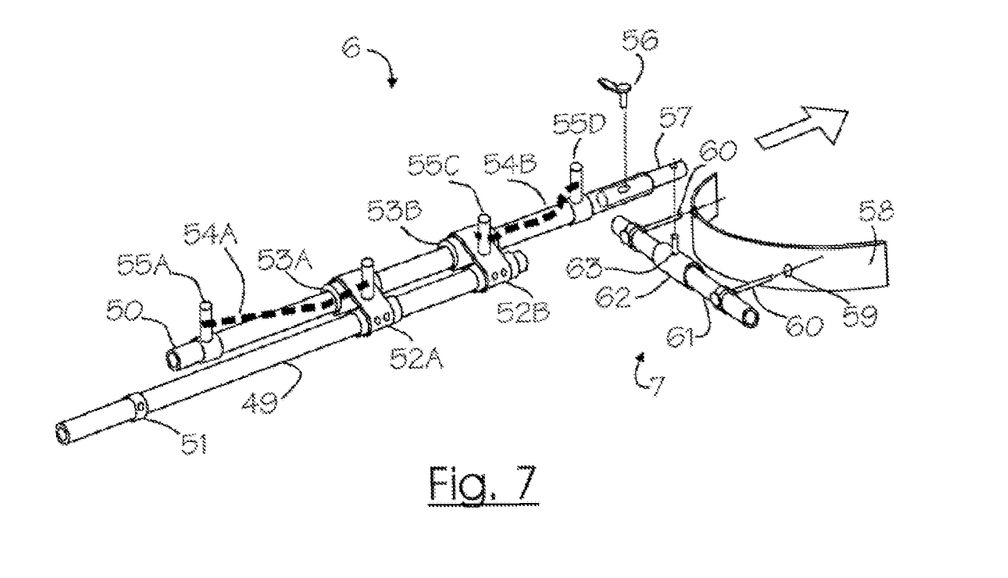
FIG. 7 shows an example of a tow bar assembly of the tow-type stroller of FIG. 1.

FIG. 7 shows an example of a resilient tow bar assembly 6 which is comprised primarily of two elongated tubes: the first tube 49 and the second tube 50 are arranged to slide longitudinally with respect to each other either coaxially (telescopically) or collocated as shown in the illustration and parallel to the direction of travel. In this example, the means by which both tubes 49 and 50 are connected to each other permits a free, sliding movement between the tubes with the first tube 49 detachably connected to the cross bar 5 and the second tube 50 is detachably connected to the articulating assembly 7. The length of the portion of the second tube 49 that is accepted into the drilled hole 22 in the crossbar 5 is limited by the location of a limiting collar 51 along the length of the first tube 49.

In the example shown, brackets 52A and 52B span across both of the tubes 49 and 50 such that one portion of each bracket is directly affixed to the first tube 49 and the other portion of each bracket is fixed to a linear bearing 53A and 53B. Each linear bearing is coaxially connected to the second tube 50. When the first tube 49 is connected to the cross bar 5, the resulting assembly arrangement constrains movement of the second tube 50 to slide only back and forth in the direction of travel towards and away from the cross bar 5. A simplified resilient means by which to mediate the anterior/posterior impulses generated between the carriage and the attendant during operation is illustrated by coupling the pair of tubes with a pair of elastic members 54A and 54B. The elastic members are arranged such that they restrict the relative linear motion between both of the tubes 49 and 50. A simplified example of a connecting means by which to couple the elastic members to the tow bar assembly 6 is shown. In this example a connecting means 55A is attached to one end of the second tube 50. One end of elastic member 54A is attached to connecting means 55A. The other end of the elastic member 54A is attached to connecting means 55B. Connecting means 55B is connected to bracket 52A. When the first tube 49 is connected to the cross bar 5, the resilient assembly described above resists the overall compression of the tow bar assembly 6 and moderates the rate of displacement of the second tube 50 towards the cross bar 5 and thus, the carriage assembly. Similarly, the overall extension of the tow bar assembly 6 is moderated via a resilient assembly where a connecting means 55C is connected to bracket 52B. One end of the elastic member 54B is attached to connecting means 55C. The other end of elastic member 54B is attached to connecting means 55D. Connecting means 55D is connected to the other end of the second tube 50.

Preferably, both elastic members 54A and 54B are attached to the respective pair of connecting means such that the elastic members are placed in a particular amount of tension when there is no axial load on the tow bar assembly. Preferably, the connecting means 55A, and 55D may be repositioned along the second tube 50 to increase or decrease the tension placed on each of the elastic members 54A and 54B. Alternatively, the overall resistance to extension and compression of the tow bar assembly 6 can be modified via selection of elastic members possessing either an increased or a decreased modulus of elasticity.

The resilient tow bar assembly 6 serves two primary functions: 1) to connect the carriage assembly and attendant so that the attendant may propel and control the carriage assembly velocity and direction, and 2) to attenuate the forward and backward impulses along the tow bar assembly 6 resulting from the accelerations and decelerations associated with walking or running as the attendant propels the carriage assembly. The resilient tow bar assembly 6 includes two rigid, elongated members which may be arranged either concentrically or in parallel and are connected to each other by means of either bushings or bearings such that the free movement between the two members is restricted to a linear motion along the axis of said members if arranged concentrically or along parallel axes if arranged in parallel. One end of the first elongated member is connected to the cross bar and the other end of said member is connected to the second elongated member. One end of the second elongated member is connected to the first elongated member and the other end of the second elongated member is connected to the attendant via an articulated assembly and a belt assembly.

The overall length of the tow bar assembly 6 varies with the position of the two elongated members 49 and 50 relative to each other. When connected to the attendant and to the carriage assembly, the overall length of the tow bar assembly extends or compresses in proportion to the distance between the carriage assembly and the attendant as the attendant either accelerates away from the carriage assembly when propelling it in the forward direction (extension) or when the attendant decelerates and the carriage continues to travel in the direction of the attendant due to the carriage's momentum (compression). Thus, the state of the tow bar assembly may be defined as being in extension or compression depending on the instantaneous overall length of the tow bar assembly. A third state, the length of the tow bar assembly at which the transition between extension and compression occurs may be defined as "neutral."

The forward and backward impulses transmitted through the tow bar assembly 6 and experienced by the attendant and the carriage assembly as the attendant propels the stroller may be attenuated by controlling the rates at which the tow bar assembly 6 extends and compresses. This may be achieved by connecting one or more elastic or damping members to the components of the tow bar assembly 6 in an arrangement that permits said elastic or damping members to moderate the extension or compression motions of the tow bar assembly 6 and thus, the rate at which the tow bar assembly 6 extends or compresses.

The forward end of the tow bar assembly 6 is detachably connected to an articulating assembly 7. In this example, a toggle clamp assembly 56 is shown as a possible means to quickly connect and disconnect one end of the second tube 50 to a connector tube 57. The articulating assembly 7 provides four degrees of freedom of movement at the point of connection between the tow bar assembly 6 and the attendant (vertical translation and rotation in the saggital plane, lateral translation and rotation in the transverse plane) relative to the carriage assembly during operation. The articulating assembly 7 comprises a belt 58 of material sufficient in strength to support the towing loads during operation having at least two holes 59 to accept standoffs 60; a single, horizontally oriented tube 61 parallel to the ground supported by said standoffs 60; a slider tube 62 fitting over said horizontally oriented tube 61 with an inner diameter greater than the outer diameter of the horizontally oriented tube 61 to permit said slider tube 62 to travel laterally and to follow the path of the horizontally oriented tube 61; a swivel pin 63 connected to the slider tube such that the axis of rotation created by the swivel pin is normal to the ground; and a connector tube 57 of which one end is connected to said slider tube 62 by means of the swivel pin 63 and the other end connects telescopically within the second tow bar assembly tube 50 providing a means to selectively vary the running distance between the attendant and the carriage assembly. The function of the swivel pin 63 serves to facilitate turning of the carriage assembly by the attendant during operation by permitting rotation of the attendant's body in the transverse plane when changing the direction of travel.

FIG. 7 shows that the articulating assembly 7 is secured to the rear portion of a waist belt 58 which is, in turn, used to connect to the attendant's waist or hips. A harness or vest may also be used in place of the waist belt provided that said harness or belt adequately distribute the anterior/posterior forces involved in propelling the carriage assembly across the attendant's torso. The belt or vest may be comprised of any variety of materials but preferably of those materials that provide the strength necessary to withstand said anterior/posterior forces involved in operation while permitting ventilation means to transfer heat away from the interior of the belt nearest the attendant's body to the incident environment. Further, the belt should provide for facile circumferential adjustment around the attendant's waist or hips to minimize movement between the articulating assembly 7 and the attendant's torso.

The tightness of the waist belt 58 around the attendant's waist provides sufficient friction around the attendant's waist to support the vertical and horizontal loads generated, in all three planes, during operation of the loaded carriage assembly.

Figure 8A:
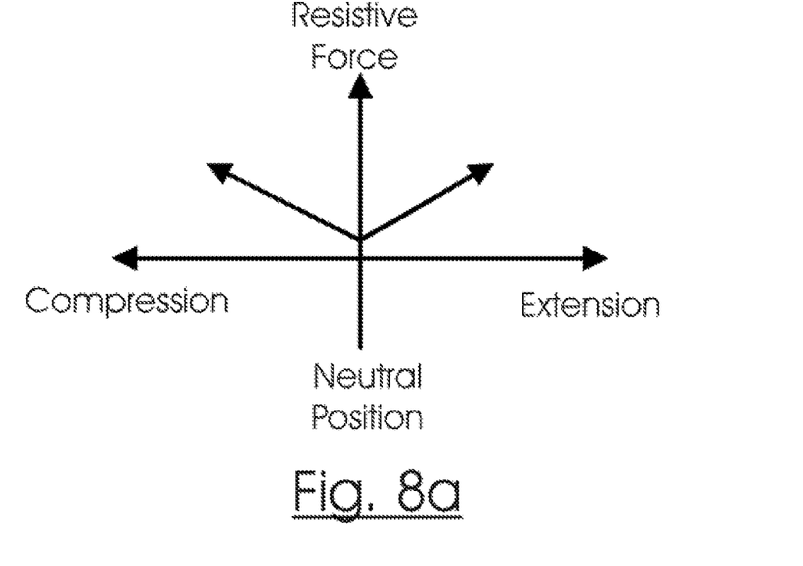
FIGS. 8a and 8b show graphs illustrating the states of transition between compression and extension in the tow bar assembly of the tow-type stroller of FIG. 1.

As previously described, one of the functions of the resilient tow bar assembly is to attenuate the forward and backward impulses along the tow bar assembly resulting from the accelerations and decelerations associated with walking or running as the attendant propels the carriage assembly. Attenuation of said impulses may be accomplished by various means. The exemplary tow bar assembly shown in FIG. 7 utilizes elastic members 54A and 54B that are connected to the components of the tow bar assembly in an arrangement such that one or more of the elastic members are maintained in a state of tension irrespective of the amount of tow bar extension or compression. The graph in FIG. 8a illustrates the relationship between the resistive forces exerted by said elastic members as a function of the tow bar compression/extension. In the graph, the horizontal axis represents the measure of the tow bar assembly extension (increasing to the right) and compression (increasing to the left), the point of origin where the axes intersect represents the transition point between tow bar assembly extension/compression (neutral position), and the vertical axis represents the amount of resistance to the compression or extension movement exerted by the elastic members on to the tow bar assembly. It is important to note that in this arrangement, there exists a single transition point between extension and compression states.

Figure 8B:
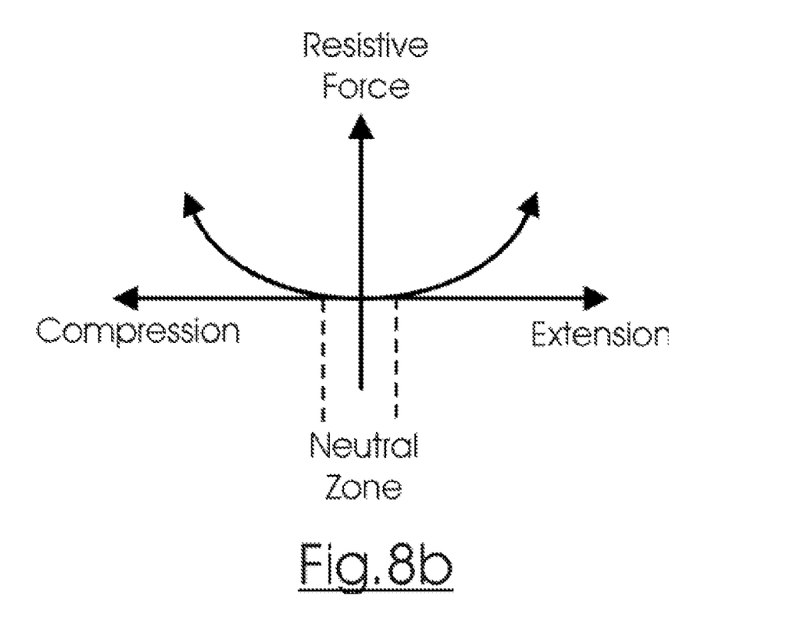

The relationship between tow bar compression/extension and resistive force may be modified from the example above through an alternate configuration wherein the elastic members may be connected to the components of the tow bar assembly in an arrangement such that the state of transition between compression/extension is expanded and bounded by a certain interval along the horizontal axis as shown in FIG. 8b. This represents a different function than the previous example where the transition between compression and extension states were limited to a single point along the horizontal axis as shown in the graph in FIG. 8a. Expanding the length of the neutral state creates a "neutral zone" along the horizontal axis. The graph in FIG. 8b shows a neutral zone defined by an interval length along the horizontal axis in which the resistance to the extension or compression of the tow bar assembly is reduced or negligible. This configuration serves to reduce or to uncouple anterior and posterior forces between carriage and attendant whenever the tow bar assembly length is within the neutral zone, thus reducing or eliminating impulses that occur when the tow bar assembly transitions between states of compression and extension. There are several arrangements by which elastic members may be connected to the tow bar assembly components to accomplish the function of creating a "neutral zone" as described above.

Figure 9:
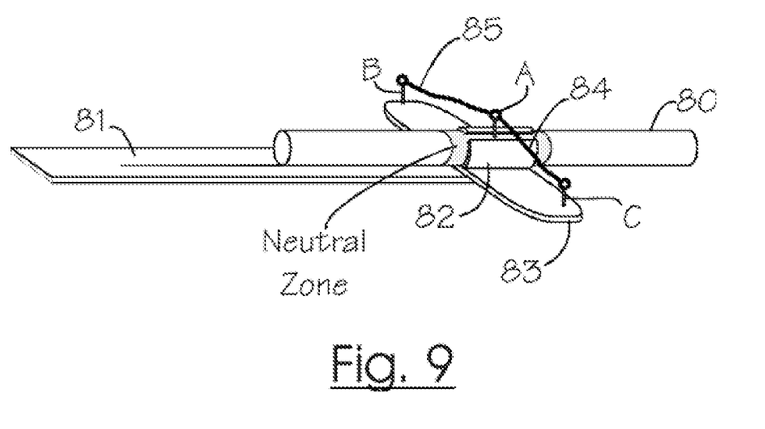
FIG. 9 shows an alternate tow bar assembly of the tow-type stroller of FIG. 1.

FIG. 9 illustrates an example of such an arrangement where a first elongated member 80 of the tow bar assembly with one end connected to the cross bar 5 and the other end detachably connected to a second elongated member 81 of the tow bar assembly by means of a linear bearing assembly 82. Said bearing assembly is permanently connected to one end of the second elongated member 81. Said second elongated member 81 is connected to the attendant via articulated assembly 7 and belt 58. The first elongated member 80 is permitted to slide axially within the linear bearing assembly 82 such that no lateral movement between the first and second elongated members is permitted. Furthermore, along a certain portion of body of the first elongated member 80 which corresponds approximately to the neutral position as previously defined, is a connecting means for connecting to one end of an elastic member such as a spring, latex tubing, resistance band, bungee cord, etc. shown as connection A which may be comprised of an eye hook traversing the body of the first elongated member 80 such that the elongated member is permitted to freely slide within the linear bearing assembly 82.

A cross bracket 83 is permanently connected to the linear bearing assembly 82 such that the elongated portions of the cross bracket extend away from the linear bearing assembly in a direction which is perpendicular to the general axis of the tow bar assembly. The purpose of the cross bracket is to provide a rigid structure upon which to support connection points for the elastic members 84 and 85 as shown in the illustration. In this example, the cross bracket 83 is comprised of a rigid, elongated member of a certain length that is fixedly connected to the linear bearing 82, said linear bearing 82 is connected to the second elongated member 81 of the tow bar assembly. The cross bracket 83 is oriented such that the elongated portion of the bracket is perpendicular to the axis of the tow bar assembly and the ends of the bracket are equidistant from the axis of the tow bar assembly.

A means for connecting elastic members 84 and 85 to the tow bar assembly components are located at each end of the elongated portion of the cross bracket shown as connection B and C, respectively. The means for connecting to the elastic members 84 and 85 to the cross bracket 83 may include, but are not limited to, an eye hook as previously described.

Figure 10:
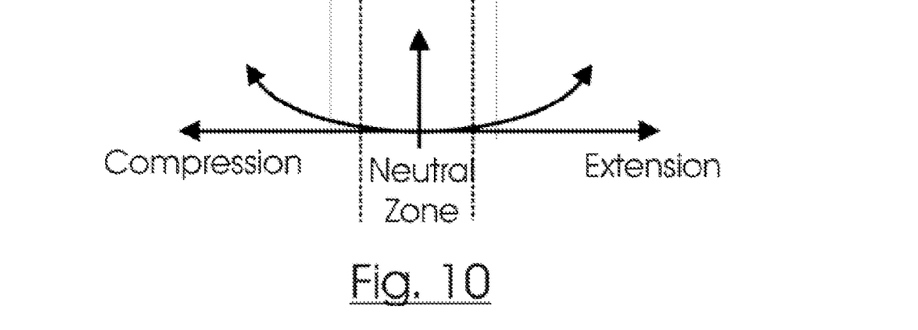
FIG. 10 shows a schematic illustrating the tow bar assembly function when elastic members connected to the tow bar components are arranged to permit an extended neutral zone in the tow bar assembly.
Figure 10A:
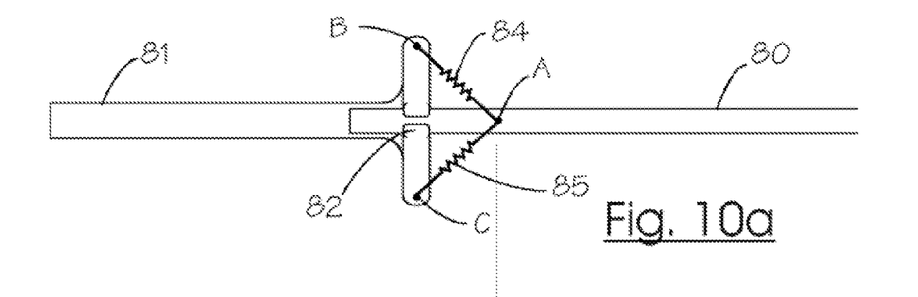
FIGS. 10a, 10b and 10c show various states of the tow bar assembly of FIG. 9.
Figure 10B:
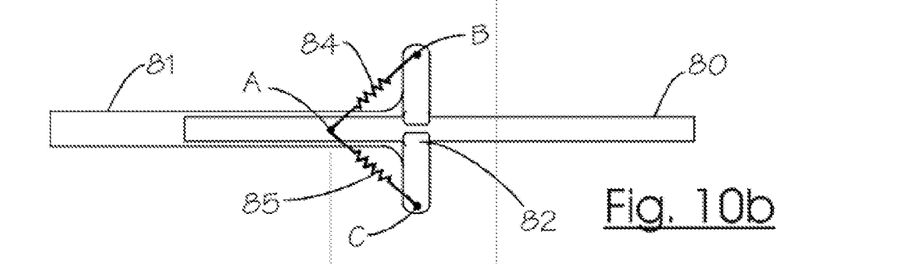
Figure 10C:
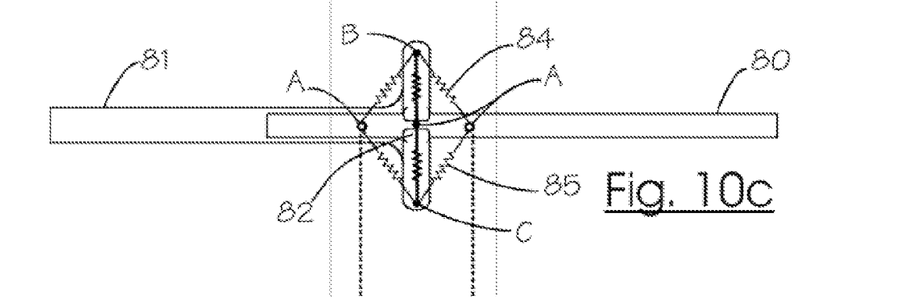

The schematics in FIG. 10 illustrate the tow bar assembly function when the elastic members connected to the tow bar assembly components are arranged to permit an extended "neutral zone" whereby said elastic components provide little or no resistance to the extension and compression motion of the tow bar assembly. FIG. 10a shows that each elastic member 84 and 85 increasingly resists the extension of the tow bar assembly as the first elongated member 80 is translated from the neutral zone towards the direction of increased extension relative to the position of the second elongated member 81. Similarly, but in the opposite sense, the compression of the tow bar assembly is resisted by the same elastic members 84 and 85 as the first elongated member 80 proceeds from the neutral zone towards the direction of increased compression (relative to second elongated member 81) as shown in FIG. 10b. FIG. 10c shows the state of the tow bar assembly is neutral when connection point A on the first elongated member 80 is in line with connection points B and C on the cross bracket 83. This position is defined as the neutral point. When the tow bar assembly length is at the neutral point, the elastic members exert no resistance to the movement between the components of the tow bar assembly. This is because each elastic member can provide resistance only in the direction axial to the elastic member. This holds true even when the elastic members are connected to their respective connection points under tension. While the position of connection A is within the "neutral zone", the elastic members impart minimal resistance because the magnitude of the axial resistive force component as compared to magnitude of the perpendicular resistive force component is relatively small. However, as connection point A travels beyond the "neutral zone" in either direction, the elastic members exert an increasingly significant resistance to the extension and compression movements of the tow bar assembly. This is because the magnitude of the axial resistive force component becomes increasingly comparable to the magnitude of the perpendicular resistive force component.

An alternate design by which to create a "neutral zone" for the tow bar assembly utilizes, in place of axial elastic members, a resistive component such as a leaf spring to control the rate of extension and compression of the tow bar assembly. Unlike the axial resistance provided by the elastic members described above, a leaf spring provides resistance in a direction which is perpendicular to the elongated axis of said leaf spring.

Figure 11A:
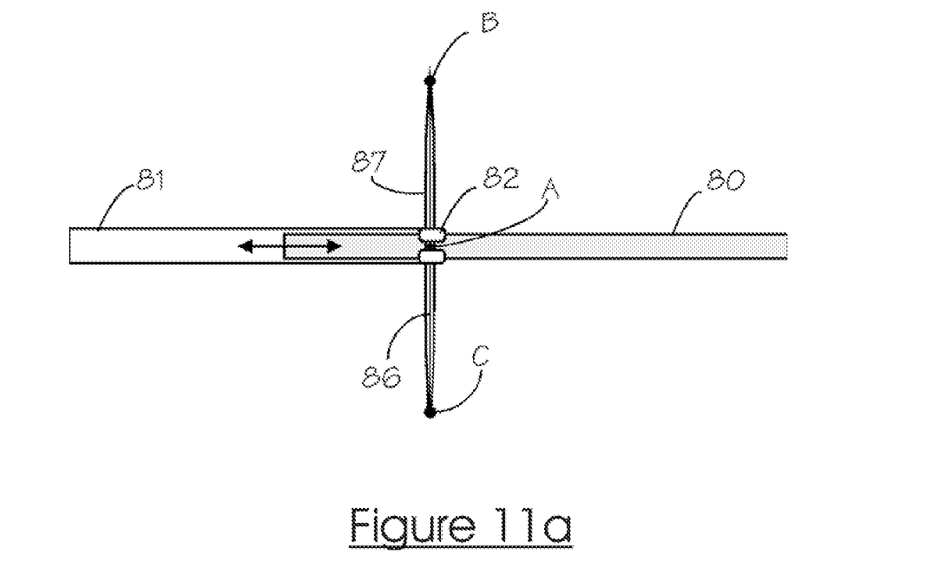
FIGS. 11a and 11b illustrate an example of an alternative crossbow arrangement of a tow bar assembly having a cantilever type spring for creating a neutral compression/extension zone.

FIG. 11a illustrates an example of an alternative arrangement for creating a "neutral zone" as described above; a cantilever type spring connected to the tow bar assembly components in an arrangement to provide resistance to the extension and compression movements of the tow bar assembly. Unlike the elastic members previously described which provide axial resistance, the cantilever type spring provides resistance to lateral deflection of said cantilever spring. A crossbow is an example of a cantilever spring.

As shown in FIG. 11a, this arrangement includes a cantilever spring 87 connected to the tow bar assembly to provide increasing resistance to the extension and compression movement of the tow bar assembly as the state of the tow bar assembly moves increasingly away from the "neutral zone". The figure shows a first elongated member 80 of the tow bar assembly with one end connected to the cross bar 5 and the other end detachably connected to a second elongated member 81 of the tow bar assembly by means of a linear bearing assembly 82. Said bearing assembly is rigidly connected to one end of the second elongated member 81. The other end of the second elongated member is connected to the attendant via articulated assembly 7 and belt 58. The first elongated member 80 is permitted to slide axially within the linear bearing assembly 82 such that no lateral movement between the first and second elongated members is permitted. Furthermore, along a certain portion of body of the first elongated member which corresponds approximately to the neutral position, as previously described, a means is provided for connecting to the first elongated member 80 a flexible material with high tensile strength, such as a wire. Said means, connection A, may be comprised of an eye hook, wire rope sling, or other wire rope assembly for the purpose of connecting to the first elongated member 80 either the ends of two separate wire lengths or the midpoint of a single length of wire. Alternatively, connection A may be comprised of a pin oriented perpendicular to the ground to provide a means of connecting to the first elongated member 80 a pair of rigid elongated members such as two metal rods so that the motion of each of the rods is limited to rotation in the transverse plane about connection A. For purposes of this discussion, either the wire or the pair of metal rods, previously described, which are attached to connection A are referred as the Cantilever Spring Hitch 86. In either of the configurations, connection A must be of sufficient strength to withstand the forces involved in propelling the carriage and occupant under a variety of loading situations and must be connected to the first elongated member 80 such that the first elongated member 80 may freely slide in either direction within the linear bearing 82.

Figure 11B:
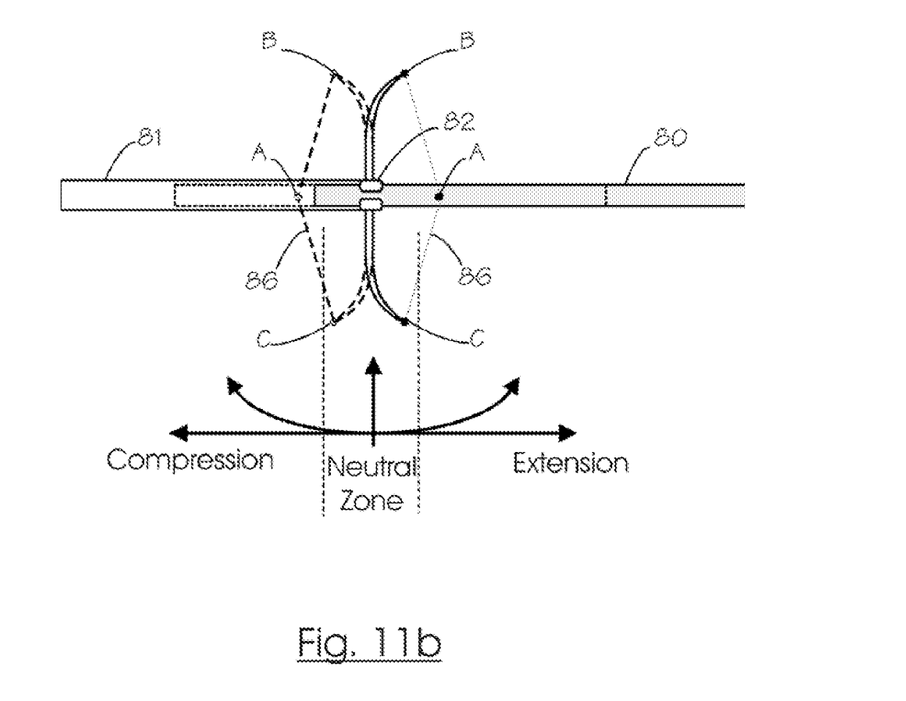

FIG. 11a shows the middle portion of a cantilever spring 87 rigidly connected to the linear bearing 82 such that the elongated portions of the cantilever spring 87 extend away from the linear bearing assembly 82 in a direction which is perpendicular to the general axis of the tow bar assembly. FIG. 11b shows the ends of the cantilever spring 87 when deflected in either the compression or extension direction along the transverse plane. At each end of the cantilever spring 87 connections B and C provide a means for connecting to the Cantilever Spring Hitch 86. Connections B and C are comprised of an eye hook, turnbuckle, or other such means that when said means are connected to the Cantilever Spring Hitch 86 act to deflect the ends of the cantilever spring 87 in the direction of travel of connection A as connection A travels increasingly towards either the elongation or compression state. In this arrangement, a cantilever spring type is connected to the components of the tow bar assembly to provide a "neutral zone" in which said cantilever spring offers negligible resistance to the extension and compression of the tow bar assembly while connection A is within said zone, however, said cantilever spring exerts increasing resistance to the tow bar assembly extension or compression as connection A travels further towards either of said states.

Figure 12:
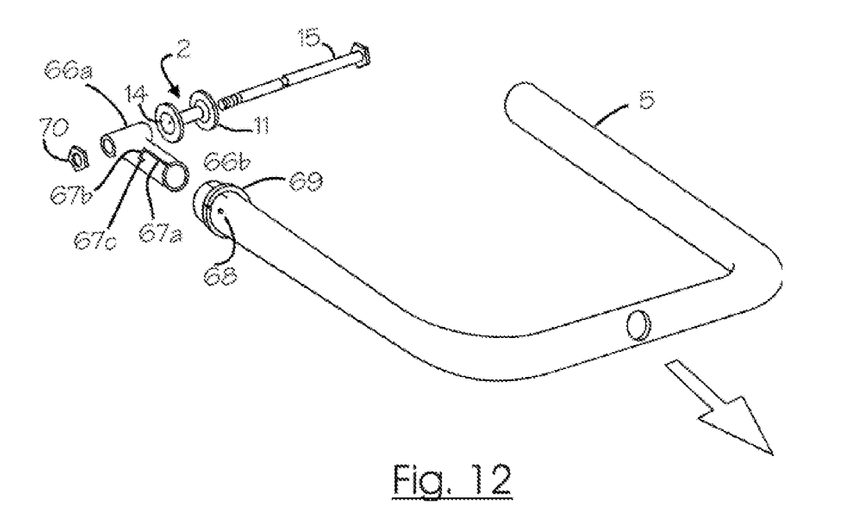
FIG. 12 shows a crossbar component of the tow-type stroller of FIG. 1.

FIG. 12 shows the crossbar 5 described in FIG. 3 is comprised of a "U" shaped member with each arm connected to the interior aspect 11 of each hub. As an example of an alternative arrangement of the carriage components described above, an axle sleeve is shown in this illustration that would accept the spindle 15 as a means of rotatably connecting to the axle sleeve 66 the wheel hubs 2. Said axle sleeve is comprised of a two tubes perpendicular to each other where the axle tube 66a is perpendicular to the direction of travel and the connecting tube 66b is parallel to the direction of travel. In this example, the threaded portion of the spindle 15 is accepted by the axle tube 66a and secured on each side of the axle tube 66a by two nuts 70. The hub 2 accepts the non threaded portion of the spindle and is rotatably secured to the axle tube such that the exterior aspect 14 of the hub is adjacent to the axle tube 66b. Each end of the crossbar 65 shown in this illustration accepts the connecting tube 66b, as the diameter of the crossbar tube 65 is greater than that of the connecting tube 66b.

A slot or groove is machined into the side of the connecting tube 66b to accept a sliding pin 68 which is secured to the side of the crossbar 65 as shown. The slot is comprised of three sections. Section 67a allows the sliding pin to travel axially along connecting tube 66b. Section 67b allows the sliding pin to travel transversely to connecting tube 66b. When the connecting tube 66b is accepted by the end of the crossbar 65, the sliding pin travels along the slot or groove just described to permit the wheel axle to be inserted, rotated, and locked into position. A collar clamp 69 may be used to clinch the outer tube of the crossbar 65 to the connecting tube 66b and thus securing the axle sleeve, spindle and wheel hub to the crossbar such that the arms of the crossbar are connected to the exterior portion 14 of the wheel hubs.

The purpose of this design alteration would be to substitute the structural support function of the carriage frame member 3 shown in FIG. 3 with the crossbar 5 shown in FIG. 8, providing that the cross bar member material is of sufficient strength and stiffness, thus eliminating the need for the carriage frame 3. The crossbar, by connecting its arms to the exterior aspects of the hubs 14, would serve to protect the wheels from coming in contact with obstacles that may be encountered during operation of the carriage.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A stroller comprising:
   a carriage assembly including: a carriage frame, a seat assembly for accommodating a passenger, and two wheels,
   wherein the two wheels are connected to the carriage frame at a single axis of rotation, said single axis of rotation including a first axle associated with a first of said two wheels and a second axle associated with a second of said two wheels, said first and second axles being separate and substantially collinear;
   an elongate cross bar rotatably coupled to said carriage frame at said single axis of rotation;
   a tow bar assembly having first and second ends, said tow bar assembly first end being fixedly coupled to said cross bar wherein the cross bar and said carriage frame rotate independently about said single axis of rotation; and
   a harness coupled to said tow bar assembly second end;
   wherein said carriage assembly has a center of gravity located below said single axis of rotation.

2. The stroller of claim 1, wherein said seat is positioned such that when a child is seated therein, a combined center of gravity of the child and said carriage assembly is located below said single axis of rotation.

3. The stroller of claim 1 wherein said carriage frame defines a
   plurality of connection points for coupling to said seat, said connection points providing a plurality of locations to which said seat can be coupled to said carriage assembly.

4. The stroller of claim 1, wherein said carriage assembly further includes a stop to limit rotation of said cross bar relative said carriage frame.

5. The stroller of claim 1, wherein said tow bar assembly attenuates acceleration of said harness relative to said carriage assembly.

6. The stroller of claim 5, wherein said tow bar assembly includes:
   a first member coupled to said cross bar;
   a second member coupled to said harness; and
   a damping element coupled to said first and second members;
   wherein said first and second members are coupled together so as to allow relative
   movement between said first and second members and said damping element attenuates both the forward and backward impulses transmitted through the tow bar assembly by controlling the rates at which the tow bar assembly extends and compresses.

7. The stroller of claim 6, wherein said first and second members are substantially parallel and said damping element is substantially parallel to said first and second members when in a neutral position.

8. The stroller of claim 6, wherein said first and second members are substantially parallel and said damping element is substantially perpendicular to said first and second members when in a neutral position.

9. The stroller of claim 1, wherein said harness is adjustably configured to be connected to an attendant to provide hands-free control of the stroller to the attendant.

* * * * *